United States Patent
Memering et al.

(10) Patent No.: US 9,140,927 B2
(45) Date of Patent: Sep. 22, 2015

(54) DISPLAY WITH LIQUID CRYSTAL SHUTTERS FOR MINIMIZING DISPLAY BORDERS

(71) Applicant: Apple Inc., Cupertino, CA (US)

(72) Inventors: Dale N. Memering, San Francisco, CA (US); Tseng-Mau Yang, Cupertino, CA (US); Christopher D. Prest, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 279 days.

(21) Appl. No.: 13/631,153

(22) Filed: Sep. 28, 2012

(65) Prior Publication Data

US 2014/0092341 A1  Apr. 3, 2014

(51) Int. Cl.
*G02F 1/1335* (2006.01)
*G02F 1/133* (2006.01)
*G02F 1/1333* (2006.01)

(52) U.S. Cl.
CPC ...... *G02F 1/133536* (2013.01); *G02F 1/13362* (2013.01); *G02F 2001/133388* (2013.01)

(58) Field of Classification Search
USPC .............................................. 349/62, 73, 5–7
See application file for complete search history.

(56) References Cited

U.S. PATENT DOCUMENTS

| | | | |
|---|---|---|---|
| 6,469,755 B1* | 10/2002 | Adachi et al. | 349/62 |
| 6,633,359 B1* | 10/2003 | Zhang et al. | 349/141 |
| 7,580,023 B2 | 8/2009 | Pugh et al. | |
| 7,940,354 B2 | 5/2011 | Okishiro et al. | |
| 2003/0016316 A1 | 1/2003 | Sahouani et al. | |
| 2003/0206254 A1* | 11/2003 | Liu et al. | 349/73 |
| 2006/0103809 A1* | 5/2006 | Bierhuizen | 353/20 |
| 2012/0212467 A1 | 8/2012 | Kohtoku | |
| 2013/0176512 A1* | 7/2013 | Posner et al. | 349/33 |
| 2014/0226210 A1* | 8/2014 | Moriwaki | 359/601 |

\* cited by examiner

*Primary Examiner* — Hoan C Nguyen
(74) *Attorney, Agent, or Firm* — Treyz Law Group; G. Victor Treyz; Joseph F. Guihan

(57) ABSTRACT

An electronic device may be provided with a display mounted in a housing. The display may have an array of display pixels that provide image light to a user. The array of display pixels may form active display structures with a rectangular shape. The rectangular active display structures may be surrounded by an inactive border region. Liquid crystal light distribution structures may be used to distribute light that is emitted from peripheral portions of the active display structures to a portion of the display overlapping the inactive border region, thereby increasing the apparent area of the display. The light distribution structures may include a liquid crystal cell, a reflecting polarizer, and a reflector that reflects light from the peripheral portions of the active display structures vertically upwards after the light has passed through the liquid crystal cell and has reflected off of the reflecting polarizer.

19 Claims, 10 Drawing Sheets

DISPLAY WITH LIQUID CRYSTAL SHUTTERS FOR MINIMIZING DISPLAY BORDERS

BACKGROUND

This relates generally to electronic devices, and more particularly, to electronic devices with displays.

Electronic devices often include displays. For example, cellular telephones and portable computers often include displays for presenting information to a user. An electronic device may have a housing such as a housing formed from plastic or metal. Components for the electronic device such as display components may be mounted in the housing.

It can be challenging to incorporate a display into the housing of an electronic device. Size and weight are often important considerations in designing electronic devices. If care is not taken, displays may be bulky or may be surrounded by overly large borders. The housing of an electronic device can be adjusted to accommodate a bulky display with large borders, but this can lead to undesirable enlargement of the size and weight of the housing and unappealing device aesthetics.

It would therefore be desirable to be able to provide improved displays for electronic devices.

SUMMARY

An electronic device may be provided with a display mounted in a housing. The display may have an array of display pixels that provide image light to a user. The array of display pixels may form active display structures with a rectangular shape. The rectangular active display structures may be surrounded by an inactive border region. Liquid crystal light distribution structures may be used to distribute light that is emitted from peripheral portions of the active display structures to a portion of the display overlapping the inactive border region, thereby providing the display with an apparent active area that is larger than the area of the active display structures.

The liquid crystal light distribution structures may include a liquid crystal cell that receives light from display pixels in the peripheral portions of the active display structures. The liquid crystal cell may be controlled by control circuitry to adjust the orientation of linearly polarized light received from the display pixels. Light that has passed through the liquid crystal call may be received by a reflecting polarizer, which reflects or transmits the light based on the polarization state of the light. A reflector may be used to reflect light from the peripheral portions of the active display structures vertically upwards towards a viewer after the light has passed through the liquid crystal cell and has reflected off of the reflecting polarizer.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, and 3.

Figure 1:
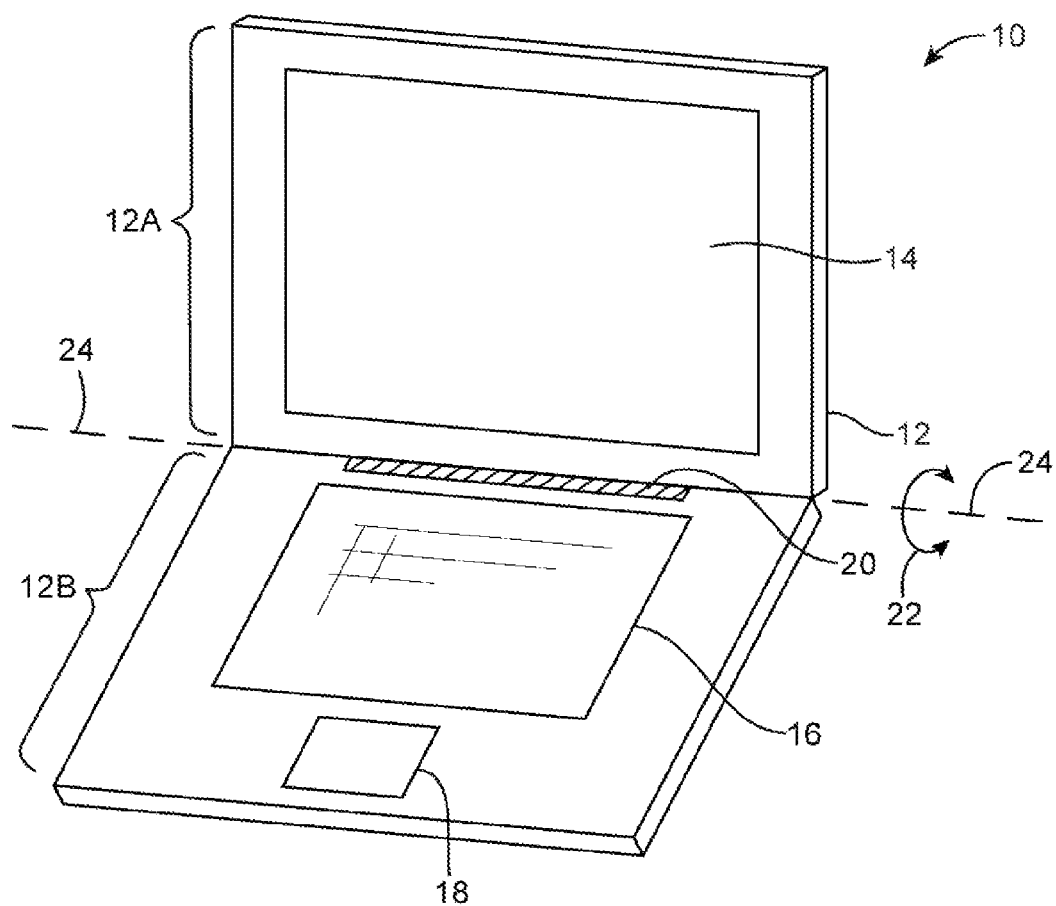
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
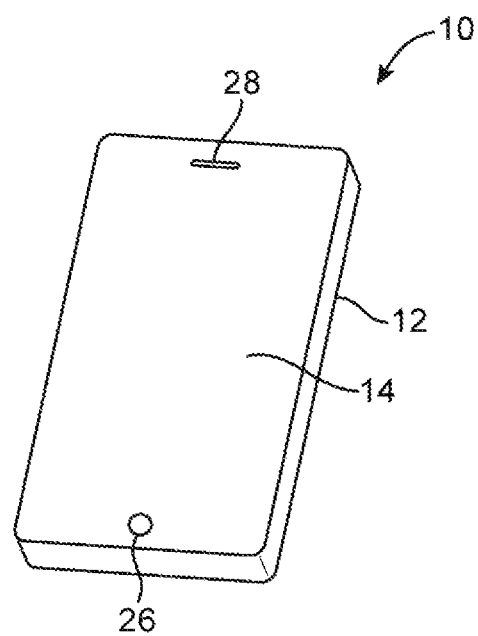
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 26. Openings may also be formed in a display cover layer or other display layer to accommodate a speaker port (see, e.g., speaker port 28 of FIG. 2).

Figure 3:
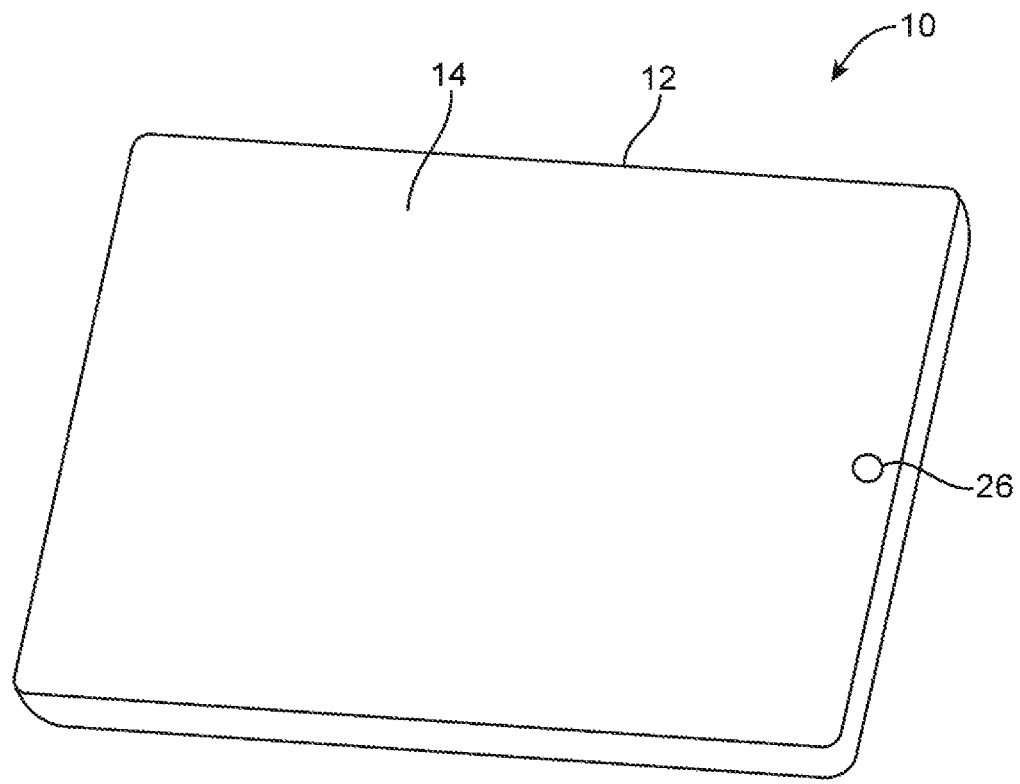
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have a cover layer or other external layer with an opening to accommodate button 26 (as an example).

The illustrative configurations for device 10 that are shown in FIGS. 1, 2, and 3 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Displays for device 10 may, in general, include image pixels formed from light-emitting diodes (LEDs), organic LEDs (OLEDs), plasma cells, electrowetting pixels, electrophoretic pixels, liquid crystal display (LCD) components, or other suitable image pixel structures. In some situations, it may be desirable to use LCD components to form display 14, so configurations for display 14 in which display 14 is a liquid crystal display are sometimes described herein as an example. It may also be desirable to provide displays such as display 14 with backlight structures, so configurations for display 14 that include a backlight unit may sometimes be described herein as an example. Other types of display technology may be used in device 10 if desired. The use of liquid crystal display structures and backlight structures in device 10 is merely illustrative.

A display cover layer may cover the surface of display 14 or a display layer such as a color filter layer or other portion of a display may be used as the outermost (or nearly outermost) layer in display 14. A display cover layer or other outer display layer may be formed from a transparent glass sheet, a clear plastic layer, or other transparent structures.

Touch sensor components such as an array of capacitive touch sensor electrodes formed from transparent materials such as indium tin oxide may be formed on the underside of a display cover layer, may be formed on a separate display layer such as a glass or polymer touch sensor substrate, or may be integrated into other display layers (e.g., substrate layers such as a thin-film transistor layer).

Figure 4:
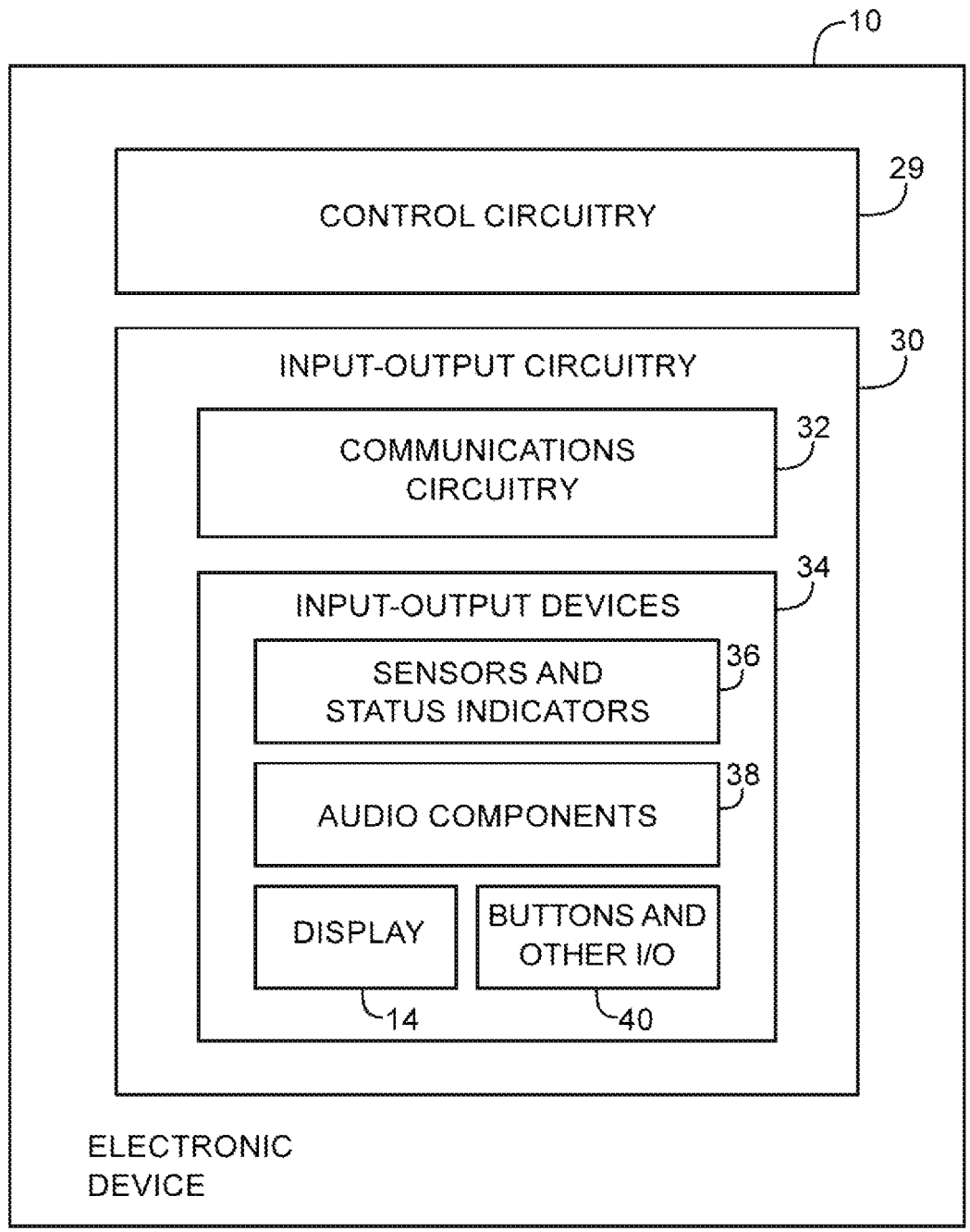
FIG. 4 is a schematic diagram of an illustrative electronic device with a display in accordance with an embodiment of the present invention.

A schematic diagram of an illustrative configuration that may be used for electronic device 10 is shown in FIG. 4. As shown in FIG. 4, electronic device 10 may include control circuitry 29. Control circuitry 29 may include storage and processing circuitry for controlling the operation of device 10. Control circuitry 29 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 29 may include processing circuitry based on one or more microprocessors, microcontrollers, digital signal processors, baseband processors, power management units, audio codec chips, application specific integrated circuits, etc.

Control circuitry 29 may be used to run software on device 10, such as operating system software and application software. Using this software, control circuitry 29 may present information to a user of electronic device 10 on display 14. Display 14 may contain an array of display pixels (e.g., liquid crystal display pixels) that are organized in rows and columns. Control circuitry 29 may be used to display content for a user of device 10 on the array of display pixels in display 14.

Control circuitry 29 may include display driver circuitry and other circuitry for controlling the rate at which display pixels are refreshed and for controlling which pixel data is displayed by each display pixel. Display driver circuitry may be formed using thin-film-transistor circuitry on display 14 and/or integrated circuits mounted on a layer in display 14 or on a printed circuit. In addition to controlling the display of pixel data using the display pixels of display 14, control circuitry 29 may perform control operations within device 10 such as controlling the states of liquid crystal light distribution structures (sometimes referred to as liquid crystal shutter structures) and other controllable electronic components. Control circuitry 29 may, for example, issue control commands that place liquid crystal light distribution structures in a desired state. Adjustments to liquid crystal light distribution structures such as these may be synchronized with display control operations. For example, control circuitry 29 can ensure that light passing through the liquid crystal light distribution structures is distributed as desired while simultaneously controlling the operation of peripheral display pixels in display 14 so that those pixels display desired pixel data for distribution by the liquid crystal light distribution structures.

Input-output circuitry 30 may be used to allow data to be supplied to device 10 and to allow data to be provided from device 10 to external devices. Input-output circuitry 30 may include communications circuitry 32. Communications circuitry 32 may include wired communications circuitry for supporting communications using data ports in device 10. Communications circuitry 32 may also include wireless communications circuits (e.g., circuitry for transmitting and receiving wireless radio-frequency signals using antennas).

Input-output circuitry 30 may also include input-output devices 34. A user can control the operation of device 10 by supplying commands through input-output devices 34 and may receive status information and other output from device 10 using the output resources of input-output devices 34.

Input-output devices 34 may include sensors and status indicators 36 such as an ambient light sensor, a proximity sensor, a temperature sensor, a pressure sensor, a magnetic sensor, an accelerometer, and light-emitting diodes and other components for gathering information about the environment in which device 10 is operating and providing information to a user of device 10 about the status of device 10.

Audio components 38 may include speakers and tone generators for presenting sound to a user of device 10 and microphones for gathering user audio input.

Display 14 (e.g., the array of display pixels in display 14) may be used to present images for a user such as text, video, and still images. Sensors 36 may include a touch sensor array that is formed as one of the layers in display 14.

User input may be gathered using buttons and other input-output components 40 such as touch pad sensors, buttons, joysticks, click wheels, scrolling wheels, touch sensors such as sensors 36 in display 14, key pads, keyboards, vibrators, cameras, and other input-output components.

Figure 5:
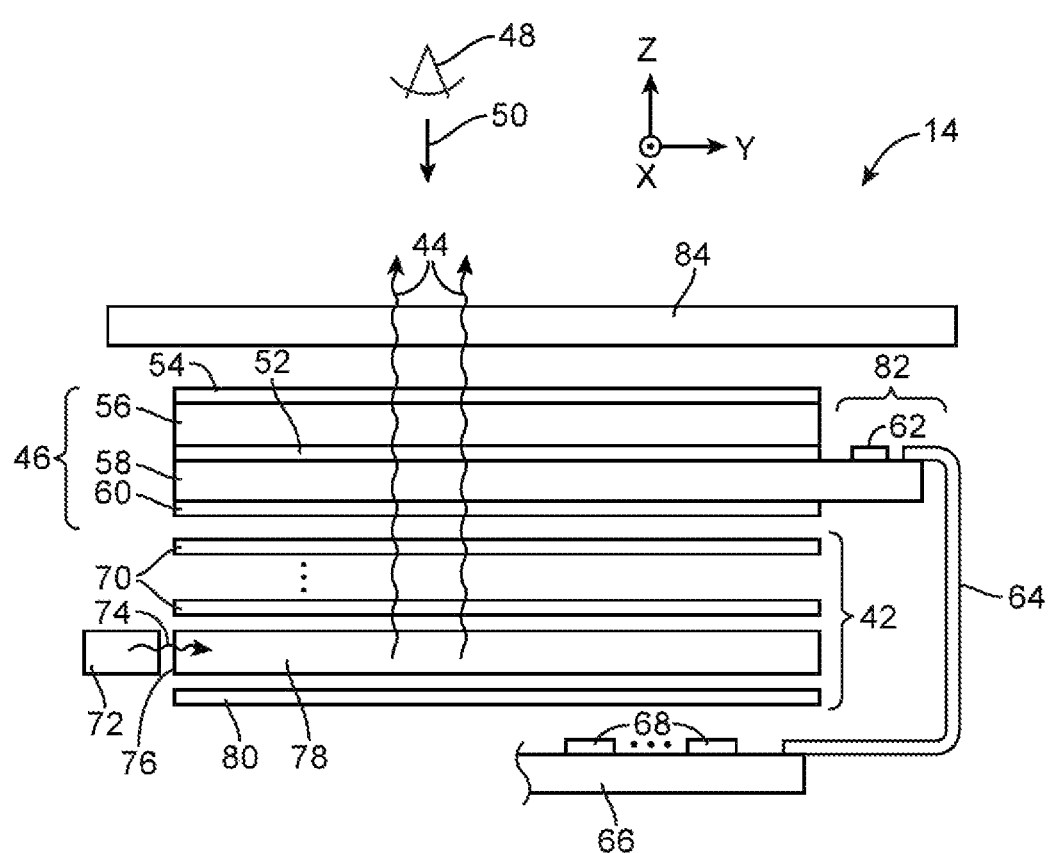
FIG. 5 is a cross-sectional side view of an illustrative display in accordance with an embodiment of the present invention.

A cross-sectional side view of an illustrative configuration that may be used for display 14 of device 10 (e.g., for display 14 of the devices of FIG. 1, FIG. 2, or FIG. 3 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display 14 may, if desired, have one or more optical structures that are located above display layers 46. For example, display 14 may have a display cover layer such as display cover layer 84. Display cover layer 84 may be formed from a layer of clear glass, a transparent sheet of plastic, or other transparent structure. Display cover layer 84 may be mounted in housing 12 (e.g., using housing sidewalls). During operation, light 44 may pass through the array of display pixels formed from display layers 46 and display cover layer 84 for viewing by user 48.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types. Display layers 46 may sometimes be referred to as a display module, a display, or an array of display pixels. The image light (light 44) that passes through the array of display pixels is used in displaying content on display 14 for user 48.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry 29 (e.g., one or more integrated circuits such as components 68 on printed circuit 66 of FIG. 5) may be used to generate information to be displayed on display (e.g., display data). The information to be displayed may be conveyed from circuitry 68 to display control circuitry such as display driver integrated circuit 62 using a signal path such as a signal path formed from conductive metal traces in flexible printed circuit 64 (as an example).

Display driver integrated circuit 62 may be mounted on thin-film-transistor layer driver ledge 82 or elsewhere in device 10. During operation of display 14, display driver circuitry 62 and/or other display control circuitry such as gate driver circuitry formed on substrate 58 or coupled to substrate 58 may be used in controlling the array of display pixels in layers 46 (e.g., using a grid of vertical data lines and horizontal gate lines).

A flexible printed circuit cable such as flexible printed circuit 64 may be used in routing signals between printed circuit 66 and thin-film-transistor layer 58. If desired, display driver integrated circuit 62 may be mounted on printed circuit 66 or flexible printed circuit 64. Printed circuit 66 may be formed from a rigid printed circuit board (e.g., a layer of fiberglass-filled epoxy) or a flexible printed circuit (e.g., a flexible sheet of polyimide or other flexible polymer layer).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint. Display layers 46 and the other display structures of FIG. 5 typically have rectangular shapes with four peripheral edges, but display configurations with other shapes may be used in forming display 14 if desired.

Figure 6:
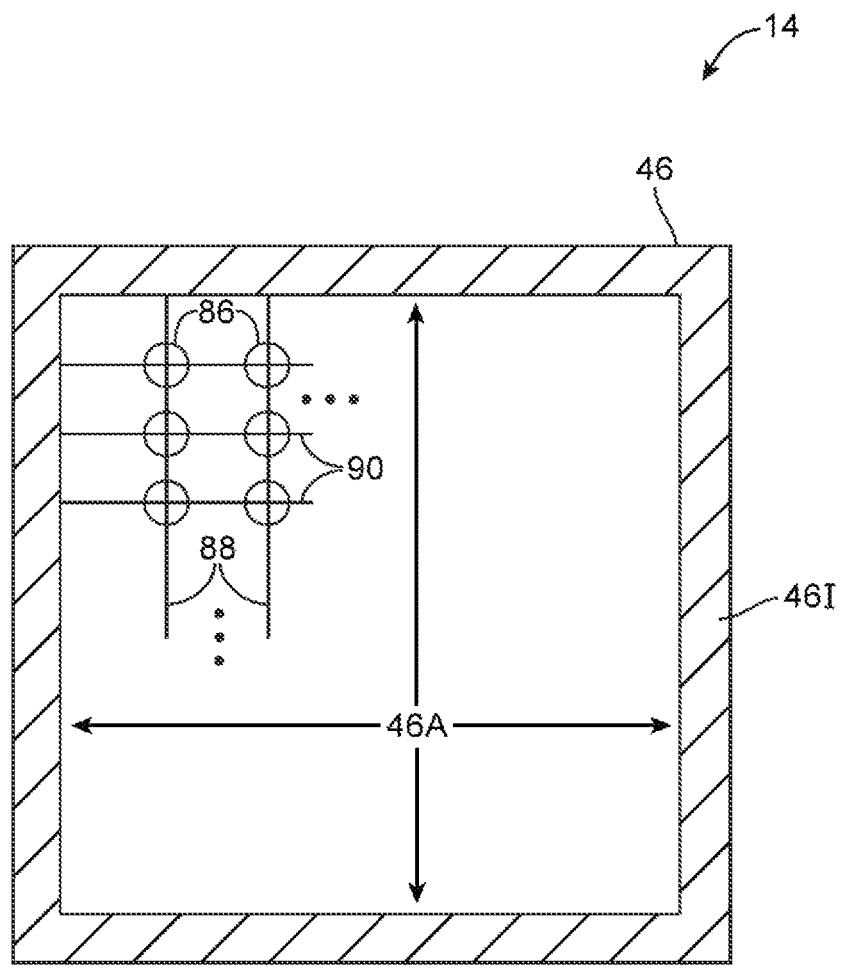
FIG. 6 is a top view of illustrative display layers in a display having an active region with an array of display pixels and an inactive border region in accordance with an embodiment of the present invention.

As shown in FIG. 6, display structures 46 of display 14 may include a plurality of display pixels 86. Display pixels 86 may be organized in rows and columns. Display control circuitry may be used in controlling the operation of display pixels 86 using signal lines such as data lines 88 and gate lines 90. In liquid crystal displays, display pixels 86 may each contain an electrode for applying an electric field to an associated portion of liquid crystal layer 52 (FIG. 5) and a thin-film (amorphous silicon or polysilicon) transistor for controlling the magnitude of the signal applied to the electrode and therefore the magnitude of the electric field. In other types of displays, display pixels 86 may be formed from other types of structures (e.g., organic light-emitting diodes, etc.).

Lines 90 may be coupled to the gates of the thin-film transistors and may sometimes be referred to as gate lines. Lines 88 may be coupled to the sources of the thin-film transistors and may sometimes be referred to as source lines or data lines. Gate driver circuitry (e.g., thin-film transistor gate driver circuitry) may be coupled to gate lines 90. Display driver circuitry that produces data signals for lines 88 (e.g., a display driver integrated circuit) may be coupled to data lines 88.

Gate driver circuitry, one or more display driver integrated circuits, traces for distributing gate and data signals and other display control signals, and other display control circuitry may be formed in inactive region 46I of display 14 and display structures 46. As an example, a display driver integrated circuit may be mounted along the upper segment of inactive region 46I, whereas gate driver thin-film circuitry may be formed along the left and right segments of inactive region 46I. During operation of display 14, display pixels 86 may display images for a user, so the portion of display structures 46 containing display pixels 86 may sometimes be referred to as active display structures or the active area of display 14. The metal traces and other display control circuit structures in inactive region 46I do not display any images, so this portion of structures 46 may sometimes be referred to as inactive display structures.

Inactive region 46I may form a border that surrounds some or all of active area 46A. For example, inactive region 46I may have a rectangular ring shape of the type shown in FIG. 6 having opposing upper and lower border segments and left and right border segments.

To provide display 14 with a borderless appearance, display 14 may be provided with light distribution structures that distribute light from peripheral display pixels near the edge of active area 46A into a portion of the display overlapping inactive area 46I. In this way, image content can be displayed over inactive area 46I, effectively increasing the lateral dimensions of display 14 and the apparent size of the display sufficiently to eliminate inactive area 46I from view by a user (i.e., making the apparent size of the display to the viewer larger than the area of structures 46 and active area 46A).

The light distribution structures that are used for distributing edge light in display 14 may be based on liquid crystal light distribution structures. As an example, a liquid crystal cell may be mounted over a peripheral display pixel. The liquid crystal cell can be controlled by control circuitry 29 to adjust the polarization of the light from the peripheral display pixel. A reflective polarizer may receive light exiting the liquid crystal cell. When the liquid crystal cell is placed in a first of two states, the light will pass vertically upwards. When the liquid crystal cell is placed in a second of the two states, the light will be deflected to the side. A secondary mirror or other reflector may then reflect the deflected light vertically upwards. If desired, other types of light distribution components may be used in distributing light near the edge of display 14 to minimize visible borders. Configurations for display 14 in which light distribution structures based on liquid crystal structures are used in distributing light near the edge of display 14 may sometimes be described herein as an example.

Figure 7:
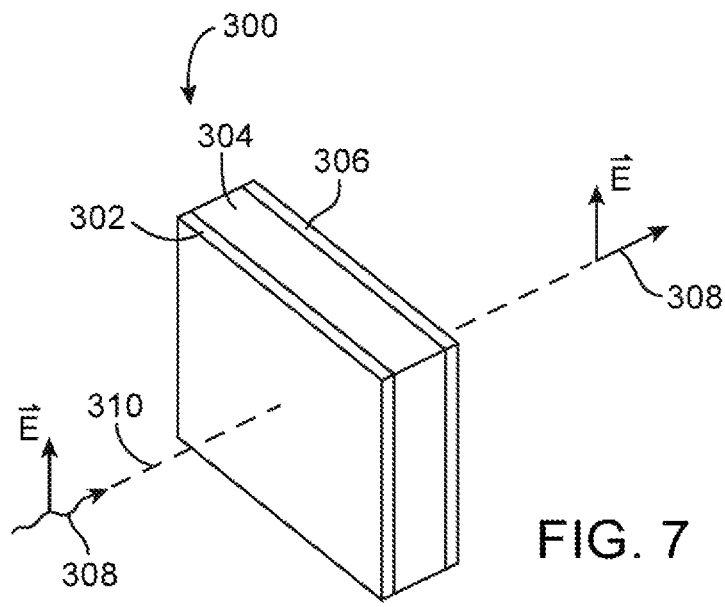
FIG. 7 is a perspective view of a liquid crystal cell in a state that does not rotate the polarization of incoming light in accordance with an embodiment of the present invention.

FIG. 7 is a perspective view of a liquid crystal cell of the type that may be used in forming liquid crystal light distribution structures for display 14. As shown in FIG. 7, liquid crystal cell 300 may, during operation of the light distribution structures, receive polarized light such as linearly polarized light 308. Light 308 may, for example, be vertically polarized light having an electric field that runs vertically (in the orientation of FIG. 7). Light 308 may propagate through liquid crystal cell 300 along axis 310.

Liquid crystal cell 300 may include a layer of liquid crystal material such as liquid crystal material 304. Liquid crystal material 304 may be sandwiched between a pair of transparent electrodes such as electrodes 302 and 306. Electrodes 302 and 306 may be formed from transparent conductive material such as indium tin oxide. If desired, other electrode configuration may be used for liquid crystal cell 300. The configuration of FIG. 7 is merely illustrative.

Using electrodes 302 and 306, control circuitry 29 may provide control signals (e.g., a control voltage) across liquid crystal material 304. The control signals may be adjusted in real time to adjust the orientation of liquid crystals within liquid crystal material 304. The orientation of the liquid crystals determines the amount of polarization rotation that will be imposed on incoming polarized light 308. When placed in a first state, such as the state of FIG. 7, liquid crystal cell 300 will not rotate vertically polarized light, so light 308 at the exit of liquid crystal cell 300 will not be rotated with respect to incoming light 308 and will have the same vertically polarized state as incoming light 308. When placed in a second state, such as the state of FIG. 8, however, liquid crystal cell 300 will rotate incoming vertically polarized light 308 by 90° to produce horizontally polarized light 308 at the exit of cell 300.

Figure 8:
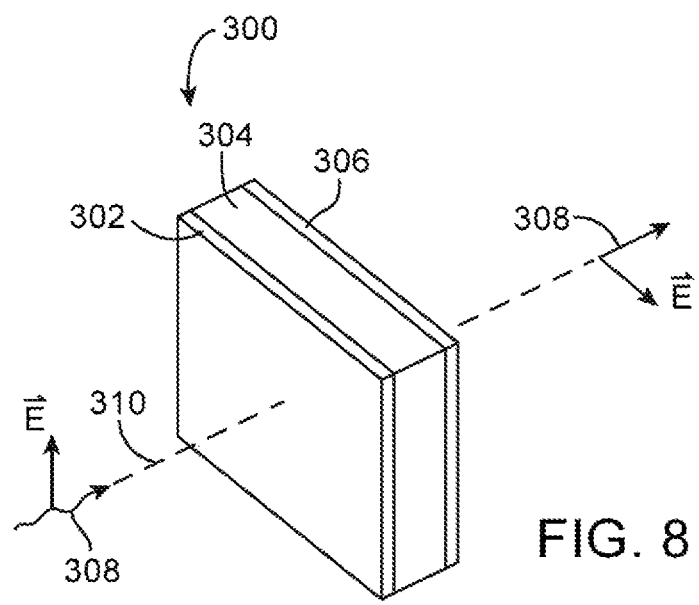
FIG. 8 is a perspective view of the liquid crystal cell of FIG. 7 in a state that rotates the polarization of incoming light by 90° in accordance with an embodiment of the present invention.

Liquid crystal polarization rotating structures such as cell 300 of FIGS. 7 and 8 may be combined with polarizer structures such as a reflecting polarizer (i.e., a linear reflecting polarizer) to form a liquid crystal shutter that can be used as a light distribution structure along the peripheral edge of display 14.

Figure 9:
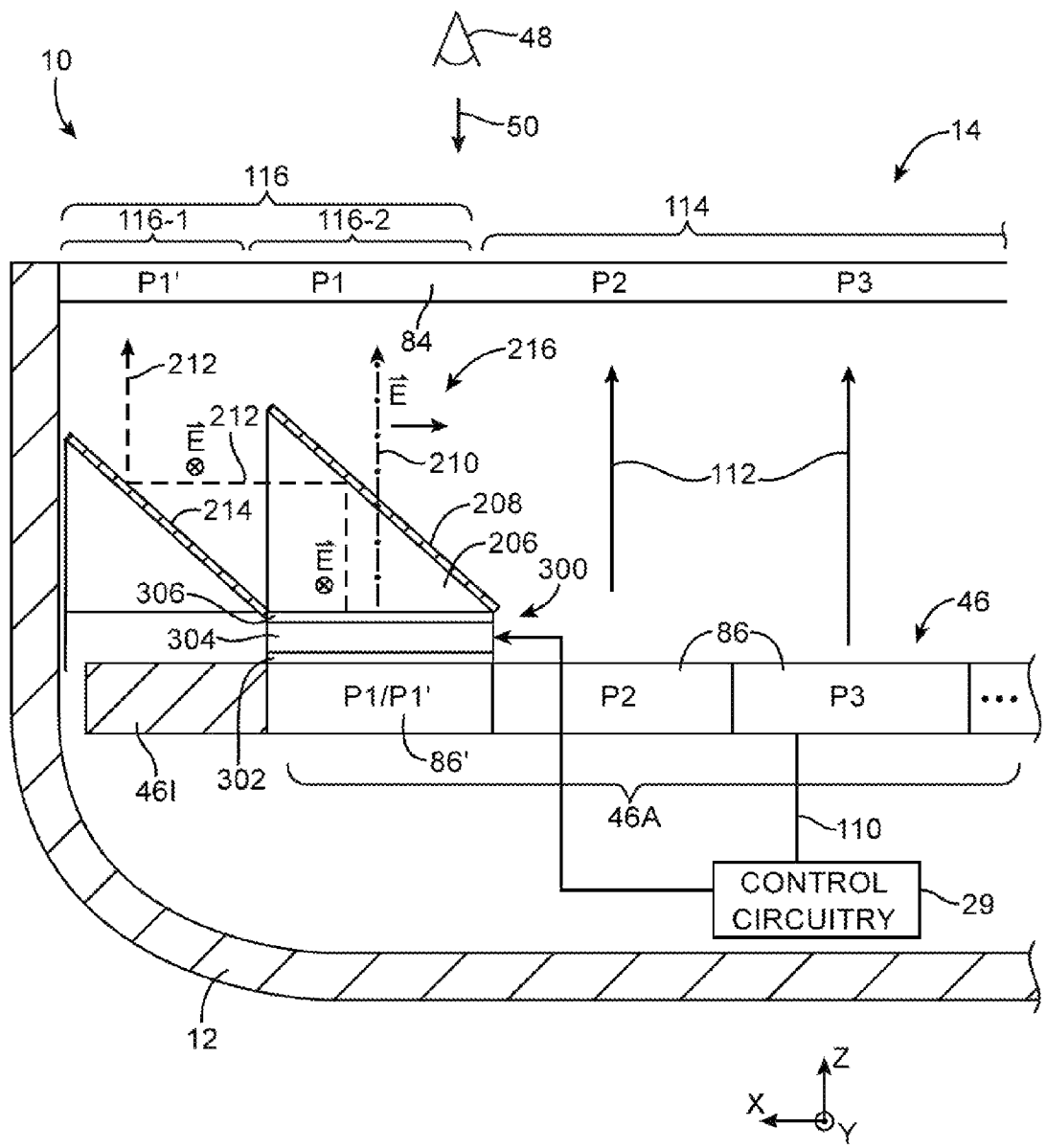
FIG. 9 is a cross-sectional side view of an illustrative electronic device with liquid crystal light distribution structures to distribute light from a pixel on the edge of a display to minimize display borders in accordance with an embodiment of the present invention.

FIG. 9 is a cross-sectional side view of display 14 in device 10 showing how light distribution structures based on liquid crystal shutter structures may be used to enhance the apparent size of display 14 and thereby reduce or eliminate the size of visible inactive border regions in display 14. As shown in FIG. 9, display 14 may include a display cover layer such as display cover layer 84. Display cover layer 84 may be mounted in housing 12 of device 10 so as to cover and protect display structures 46. Display structures 46 may include active structures 46A containing display pixels and inactive structures 46I that are devoid of display pixels. Display structures 46 may include central pixels such as display pixels 86. Display pixels 86 may produce light 112 that travels vertically upwards to viewer 48 in region 114 of display 14. Display structures 46 may also include a rectangular ring of peripheral display pixels such as peripheral display pixel 86' that surround central display pixels 86. During operation of display 14, light distribution structures 216 may be used to distribute light from peripheral pixels such as display pixel 86' alternately into portions 116-1 and 116-2 of region 116 of display 14. Because region 116 overlaps inactive portion 46I of display structures 46 (when viewed from the position of viewer 48), the use of light distribution structures 216 to distribute pixel data from peripheral display pixel 86' into region 116 increases the apparent size of display 14 and minimizes or eliminates visible inactive border regions in display 14.

Control circuitry 29 can control which content is displayed on display pixels 86 of display structures 46 at a given time. Control circuitry 29 may, for example, supply display pixel data and control signals to display pixels 86 using signal paths such as signal path 110. Synchronously, control circuitry 29 may supply control signals on path 108 to adjust liquid crystal cell 300. By adjusting liquid crystal cell 300, control circuitry 29 can adjust the polarization of light from display pixel 86'.

Light exiting display pixel 86' is linearly polarized, because this light has passed through upper linear polarizer 54 (FIG. 5). In response to control signals from control circuitry 29, cell 300 may be used to maintain the initial linear polarization orientation of the light exiting display pixel 86' or may be used to rotate the polarization of this light by 90°, as described in connection with FIGS. 7 and 8.

Upon exiting cell 300, light from display pixel 86' will either be linearly polarized with an electric field that is oriented within the page of FIG. 9 (as illustrated by light ray 210) or will be linearly polarized with an electric field that is oriented perpendicular to the page of FIG. 9 (as illustrate by light ray 212).

Reflective polarizer 208 may be mounted on a support structure such as support structure 206 at a 45° angle relative to display structures 46. Light rays such as light rays 210 will be produced when display pixel 86' is producing light and cell 300 has been placed in a first of its two polarization rotating states. Light rays such as light rays 212 will be produced by display pixel 86' when display pixel 86' is producing light and cell 300 has been placed in a second of its two polarization rotating states. Reflective polarizer 208 is oriented to allow light 210 to pass vertically through reflective polarizer 208 to portion 116-2 of region 116 while reflecting light 212 horizontally onto reflector 214. Reflector 214 is configured to reflect light 212 from reflective polarizer 208 vertically upward into portion 116-1 of region 116.

Control circuitry 29 may direct pixels 86 to display pixel data such as pixel data P2, P3, . . . in the central portion of display structures 46. Control circuitry 29 may change the state of display pixel 86' at twice the rate of display pixels 86. For example, while displaying pixel data P2 in the leftmost display pixel 86, control circuitry 29 may direct pixel 86' to display pixel data P1 (while placing cell 300 is its first state) and then to display pixel data P1' (while placing cell 300 in its second state).

Control circuitry 29 can therefore alter the pixel data that is being presented by display pixel 86' while synchronously adjusting the state of cell 300 in liquid crystal light distribution structures 216 so as to ensure that the light from display pixel 86' is distributed across portion 116 of display 14. Taken together, display portion 116, which receives light from light distribution structures 216, and display portion 114, which is associated with light 112 from central display pixels 86, have a size that is larger than display structures 46 (and that is larger than active structures 46A). By alternating the state of cell 300 while simultaneously controlling the pixel data that is displayed by display pixel 86', control circuitry 29 can distribute display light over inactive border region 46I, increasing the apparent size of the active region in display 14 and ensuring that display 14 appears borderless.

Light distribution structures such as light distribution structures 216 of FIG. 9 that are formed from liquid crystal cell 300, reflective polarizer 208 and reflector 214 may be formed in linear arrays along the left and right borders of display 14 (and, if desired, along the upper and lower borders of display 14 in addition to along the left and right borders of display 14). This allows one or more, two or more, three or more, or four or more of the edges of display 14 to be provided with distributed pixel data in regions such as region 116 of FIG. 9.

Figure 10:
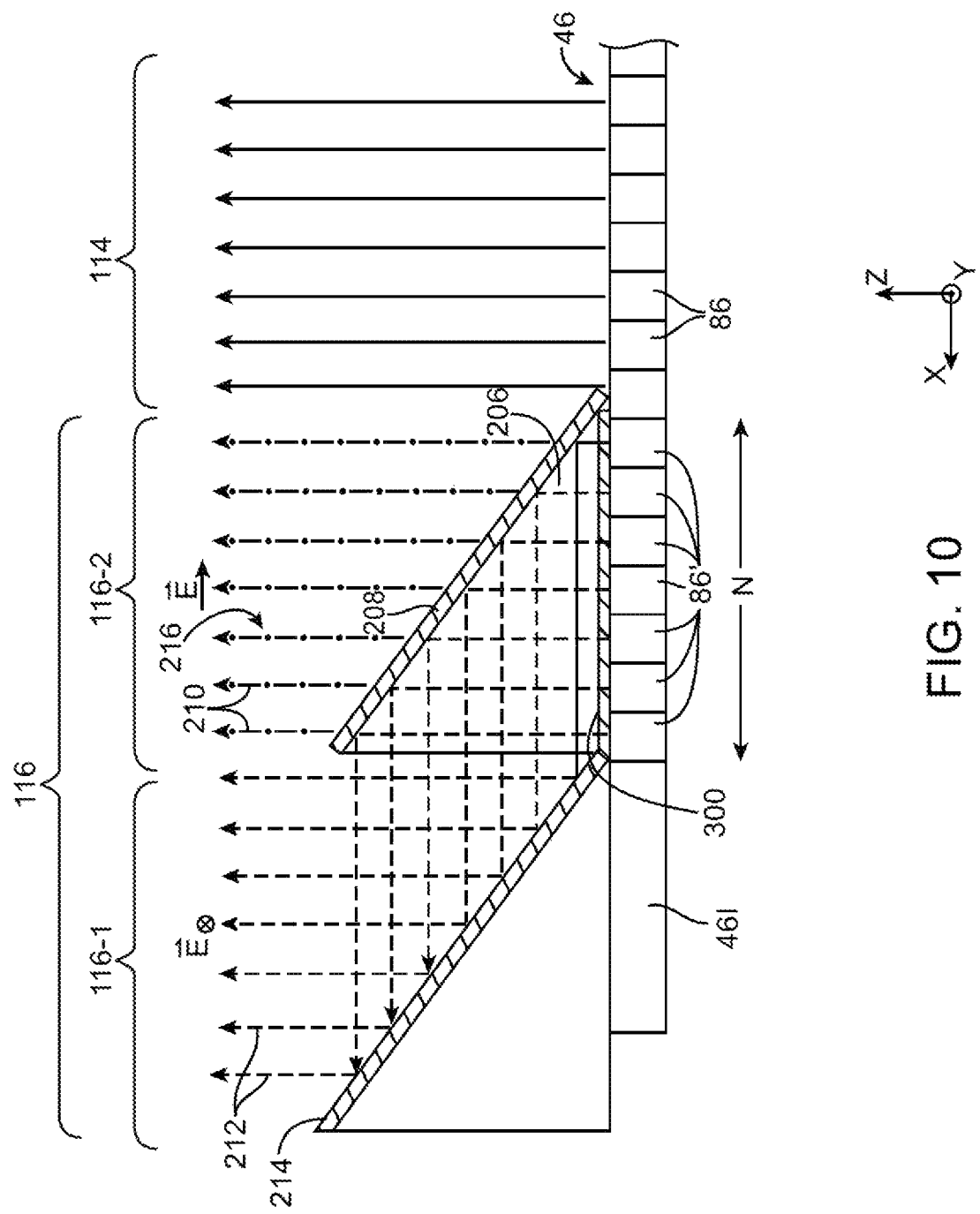
FIG. 10 is a cross-sectional side view of an illustrative electronic device with liquid crystal light distribution structures to distribute light from multiple pixels on the edge of a display to minimize display borders in accordance with an embodiment of the present invention.

If desired, the components of light distribution structures 216 such as reflective polarizer 208 may be used to distribute light from multiple peripheral display pixels in parallel. This type of configuration is shown in FIG. 10. As shown in FIG. 10, a set of peripheral display pixels 86' such as a strip of display pixels 86' of width N may run along the peripheral edge of display structures 46 (into the page in the orientation of FIG. 10). Liquid-crystal cell 300 may distribute light 210 from display pixels 86' into portion 116-2 of peripheral display region 116 and may, after control circuitry 29 has changed the data being displayed by display pixels 86', distribute light 210 from display pixels 86' into portion 116-1 of display region 116.

Figure 11:
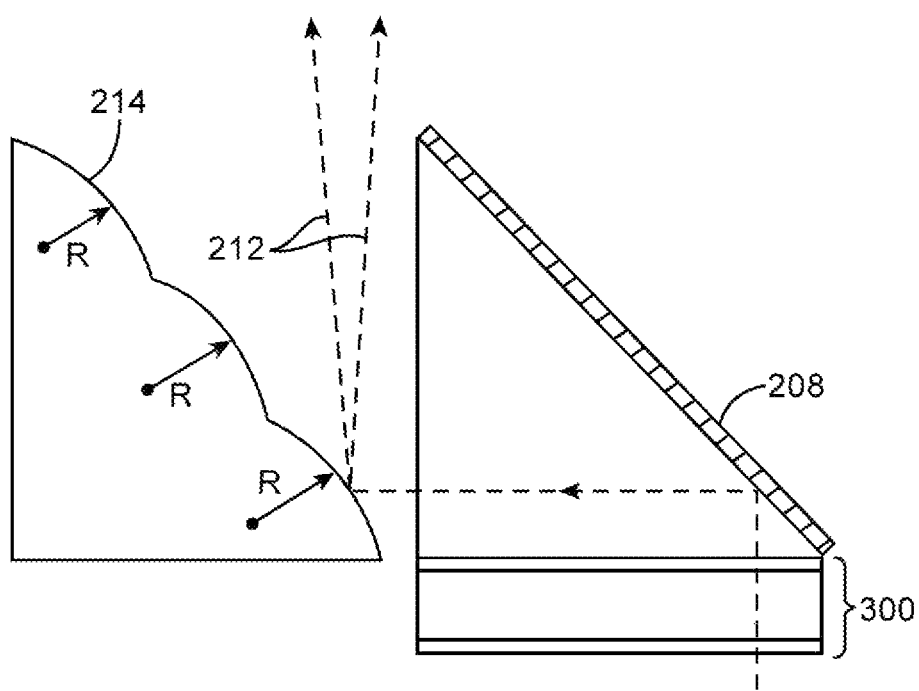
FIG. 11 is a cross-sectional side view of an illustrative liquid crystal shutter structure with an associated reflector having non-planar surfaces in accordance with an embodiment of the present invention.

FIG. 11 shows how reflector 214 may, if desired, have a non-planar surface. In the example of FIG. 11, reflector 214 has three curved surface regions each of which has a radius of curvature R. The use of curved surfaces in reflector 214 may help distribute reflected light 210.

Because light distribution structures 216 spread out the light from display pixels 86' over multiple regions such as regions 116-1 and 116-2, whereas light 212 from display pixels 86 passes directly through display cover layer 86 to viewer 48 in region 114, the intensity of light in region 116 has the potential for being lower than the intensity of light in region 114. For example, when spreading light from a peripheral display pixel over two regions such as regions 116-1 and 116-2, the intensity of light in each pixel location in region 116 will be half of the intensity of light in each pixel location in region 114, because pixel regions 116-1 and 116-2 are each illuminated for half of the time as the pixel regions in region 116.

To compensate for the decreased light intensity in region 116 relative to region 114, backlight unit 42 may be configured to provide backlight 44 with a greater intensity under peripheral pixels such as pixel 86' than under central pixels such as pixels 86. The backlight for pixel 86' of FIG. 9 may be, for example, twice as bright as the backlight for each of pixels 86.

Figure 12:
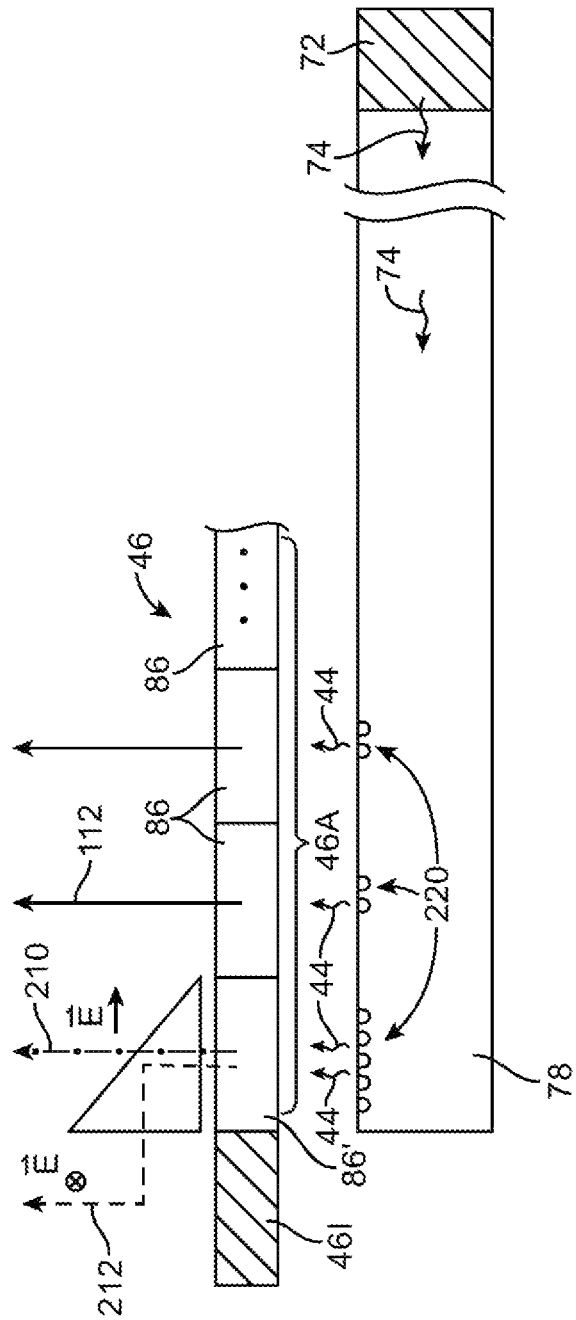
FIG. 12 is a cross-sectional side view of a display having a light guide plate with a locally increased scattering feature density to enhance light intensity for a peripheral display pixel producing light that is distributed using liquid crystal light distribution structures in accordance with an embodiment of the present invention.

As shown in FIG. 12, locally increased backlight intensity may be produced by configuring light scattering features 220 (e.g., bumps, pits, and/or the type of bumps or pits used) in light guide plate 78 to ensure that the amount of backlight 44 that is scattered upwards through pixel 86' is twice as much (or other suitable ratio) as the amount of backlight 44 that is scattered upwards through pixels 86'. For example, in a light guide plate configuration that uses pits to scatter backlight, the pits that are formed on the portion of light guide plate 78 that lies under pixels 86' may be twice the density of pits that are formed on the portion of light guide plate 78 that lies under pixels 86 (or other suitable ratio).

The foregoing is merely illustrative of the principles of this invention and various modifications can be made by those skilled in the art without departing from the scope and spirit of the invention.

What is claimed is:

1. A display for displaying content with an apparent size to a user, the display comprising:
   active display structures having an area, having a central region of display pixels, and having a peripheral edge region of display pixels; and
   adjustable liquid crystal light distribution structures formed separately from the active display structures that distribute light from the display pixels in the peripheral edge region to make the apparent size of the display larger than the area of the active display structures, wherein the adjustable liquid crystal light distribution structures include a reflecting polarizer, and wherein the adjustable liquid crystal light distribution structures include a liquid crystal cell having a layer of liquid crystal material interposed between a pair of transparent electrodes.

2. The display defined in claim 1 wherein the active display structures include an array of display pixels with a rectangular periphery and wherein the adjustable liquid crystal light distribution structures are located along at least part of the rectangular periphery.

3. The display defined in claim 2 wherein the adjustable liquid crystal light distribution structures include a reflector that receives reflected light from the reflecting polarizer.

4. The display defined in claim 3 wherein the reflector includes non-planar surfaces.

5. The display defined in claim 3 wherein the reflector is configured to reflect the light from the display pixels in the peripheral edge region that has passed through the liquid crystal cell and that has reflected from the reflecting polarizer.

6. A display for viewing by a viewer, comprising:
display structures having a first set of active display pixels and a second set of active pixels; and
liquid crystal light distribution structures that are operable in a first state in which light from the second set of active display pixels is passed vertically upwards towards the viewer and has a linear polarization with a first orientation and a second state in which the light from the second set of active display pixels is reflected horizontally and has a linear polarization with a second orientation that is different than the first orientation.

7. The display defined in claim 6 further comprising a reflector that reflects the light that is reflected horizontally in a vertical direction towards the viewer.

8. The display defined in claim 7 wherein the display structures include a color filter layer, a thin-film-transistor layer, a liquid crystal layer interposed between the color filter layer and the thin-film transistor layer, an upper polarizer on the color filter layer, and a lower polarizer on a lower surface of the thin-film transistor layer.

9. The display defined in claim 6 wherein the display structures include a display pixel array, wherein the first set of display pixels forms a central portion of the display pixels in the display pixel array, wherein the second set of display pixels forms peripheral display pixels that surround the central portion of the display, and wherein the liquid crystal light distribution structures are configured to distribute light from the peripheral display pixels.

10. The display defined in claim 9 wherein the liquid crystal light distribution structures include a liquid crystal cell having a layer of liquid crystal material.

11. The display defined in claim 10 wherein the liquid crystal light distribution structures include a reflecting polarizer that receives light from the peripheral display pixels that has passed through the layer of liquid crystal material in the liquid crystal cell.

12. The display defined in claim 11 wherein the liquid crystal light distribution structures include a reflector that reflects light that has reflected from the reflecting polarizer.

13. The display defined in claim 12 wherein the display structures include a color filter layer, a thin-film-transistor layer, and a liquid crystal layer interposed between the color filter layer and the thin-film transistor layer.

14. The display defined in claim 13 further comprising a polarizer on the color filter layer through which the light from the peripheral display pixels passes.

15. The display defined in claim 14 further comprising a backlight unit having a light guide plate, wherein the light guide plate has light scattering structures that are configured to scatter brighter backlight through the peripheral display pixels than through the central portion of the display pixels.

16. The display defined in claim 6, wherein all of the light passed vertically upwards towards the viewer in the first state has the linear polarization with the first orientation, and wherein all of the light reflected horizontally in the second state has the linear polarization with the second orientation.

17. An electronic device, comprising:
liquid crystal display structures including central display pixels and peripheral display pixels that surround the central display pixels;
liquid crystal light distribution structures that distribute light from the peripheral display pixels, wherein the liquid crystal light distribution structures comprise a liquid crystal cell formed above the peripheral display pixels; and
control circuitry that synchronously controls the peripheral display pixels and the liquid crystal light distribution structures.

18. The electronic device defined in claim 17 wherein the liquid crystal light distribution structures include a reflecting polarizer.

19. The electronic device defined in claim 17 wherein the light crystal display structures include an upper polarizer and wherein liquid crystal cell has a layer of liquid crystal material that receives light from the peripheral display pixels that has passed through the upper polarizer.

* * * * *